United States Patent [19]

Bell et al.

[11] 3,743,854
[45] July 3, 1973

[54] SYSTEM AND APPARATUS FOR DUAL TRANSMISSION OF PETROCHEMICAL FLUIDS AND UNIDIRECTIONAL ELECTRIC CURRENT

[75] Inventors: Christy W. Bell, Berwyn; Charles H. Titus, Newtown Square, both of Pa.

[73] Assignee: General Electric Company, Philadelphia, Pa.

[22] Filed: Sept. 29, 1971

[21] Appl. No.: 184,701

[52] U.S. Cl. .................................. 307/147, 174/47
[51] Int. Cl. ............................................ H01b 7/00
[58] Field of Search ...................... 307/147; 174/47; 290/2; 340/320; 219/292

[56] References Cited
UNITED STATES PATENTS

| | | | |
|---|---|---|---|
| 3,610,875 | 10/1971 | Dal Molin | 174/47 X |
| 3,400,737 | 9/1968 | Matthews et al. | 174/47 |
| 2,483,301 | 9/1949 | Roberds | 174/47 X |
| 3,324,225 | 6/1967 | Thostrup | 174/47 |
| 2,795,397 | 6/1957 | Hull et al. | 174/47 |
| 650,987 | 6/1900 | Ostergren | 174/47 X |

Primary Examiner—Robert K. Schaefer
Assistant Examiner—William J. Smith
Attorney—J. Wesley Haubner

[57] ABSTRACT

Discloses a multiple duct delivery conduit for dual transport of fluid refinery products and direct current electric power over long distances in combination with a system of energy conversion for supplying such products and power from one or more oil and/or gas wells at a source location. The dual conduit comprises two conductive pipes each used to convey electric current and a fluid petroleum derivative and an enclosing pipe for conveying a dielectric gas.

19 Claims, 6 Drawing Figures

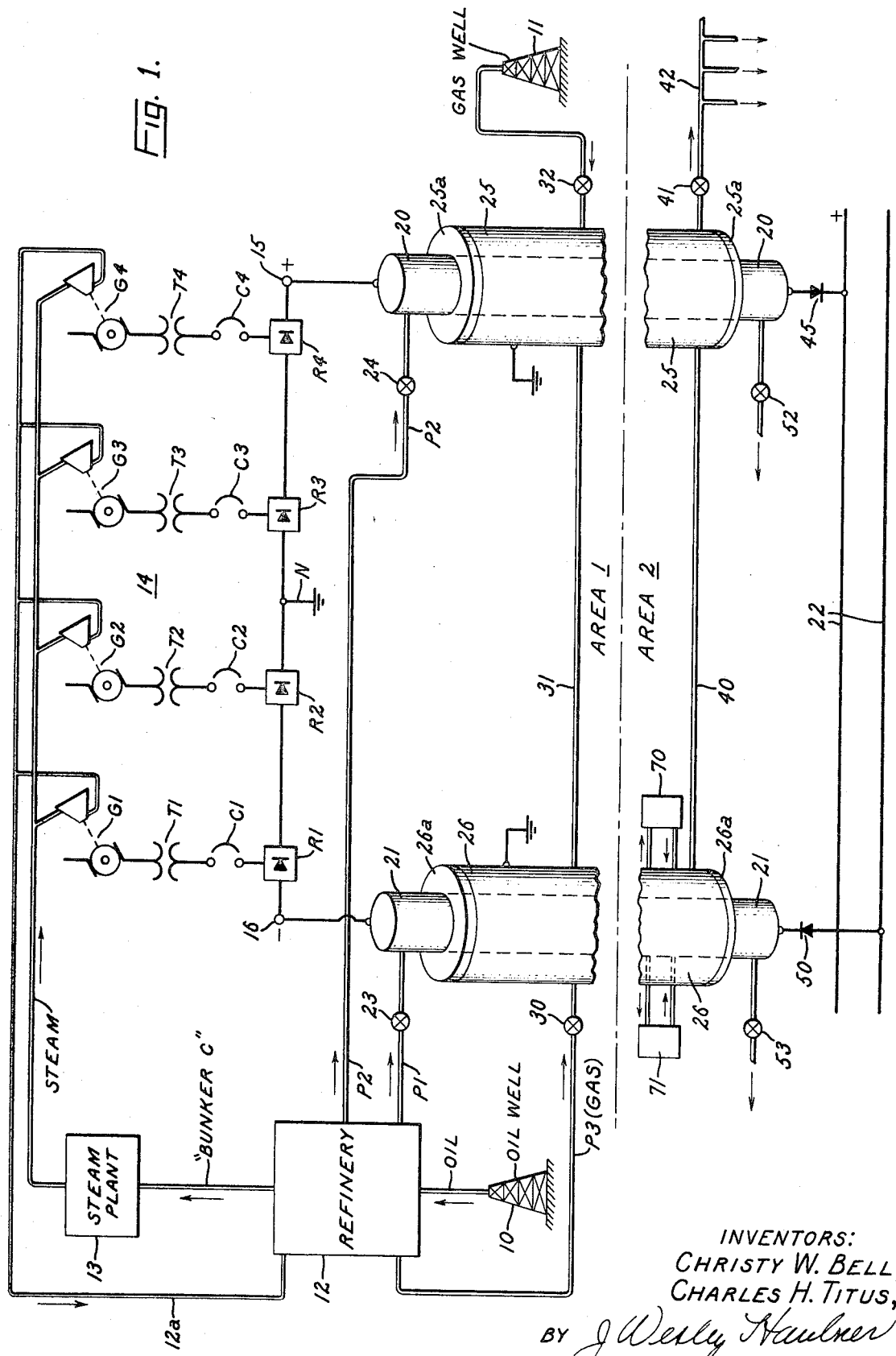

Patented July 3, 1973 3,743,854
2 Sheets-Sheet 2
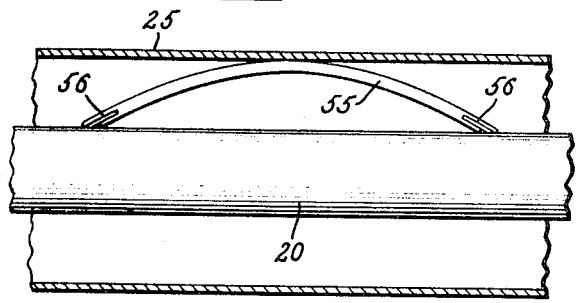
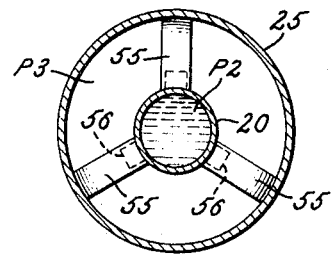
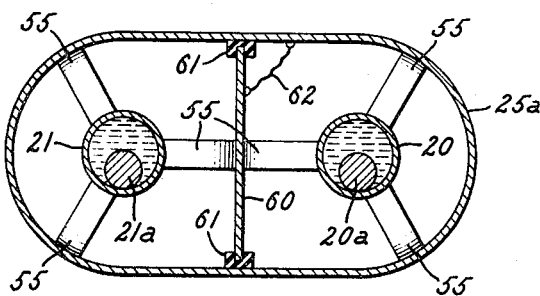
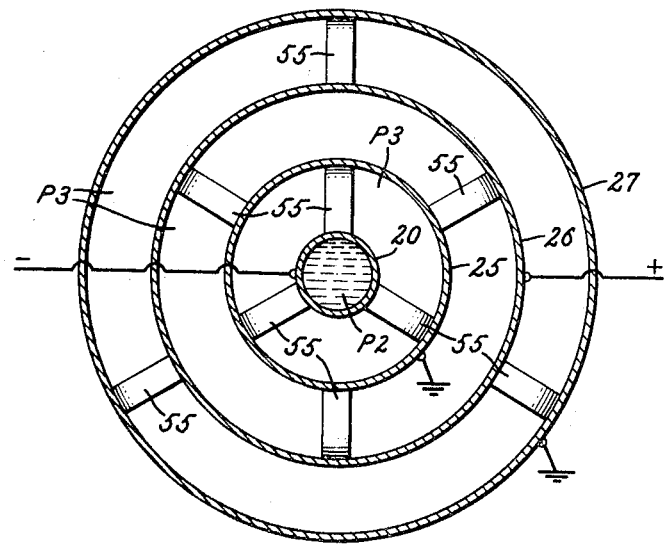
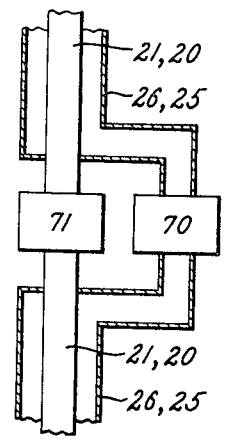
INVENTORS:
CHRISTY W. BELL,
CHARLES H. TITUS,
BY J. Wesley Haubner
ATTORNEY

SYSTEM AND APPARATUS FOR DUAL TRANSMISSION OF PETROCHEMICAL FLUIDS AND UNIDIRECTIONAL ELECTRIC CURRENT

Our invention relates to a system and apparatus for energy conversion and transmission adapted to convey fluid petrochemical refinery products and electric power through a common dual delivery conduit. The system and apparatus is especially adapted to deliver hydrocarbon fluids or other petroleum derivatives and unidirectional electric current over substantial distances from a remote well location to a distant delivery point for distribution or utilization. The following published prior art is representative of that now known to applicant:

U.S. Pat. No. 2,141,912 — Hobart
U.S. Pat. No. 2,173,717 — Hobart
U.S. Pat. No. 2,197,639 — Hobart
U.S. Pat. No. 2,215,290 — Hobart
Journal of the Franklin Institute, Vol. 234, No. 3, Pages 251–354

The discovery of large subterranean deposits of oil and gas at remote locations far removed from centers of population presents very difficult problems in transportation. Gas and oil in their natural condition may be moved over considerable distance by pipeline, or may be moved in bulk by ship. HOwever, where great distances are involved, ambient temperatures are far below 0°C and topographical obstructions, earth faults or the like are encountered, transport of crude petroleum or natural gas, either by ship or pipeline, is hazardous and expensive.

While it is possible to convert all or some of such subterranean hydrocarbon materials to electrical energy at a point adjacent the wells, the transmission of such energy in the usual alternating current form requires widely spaced transmission conductors above ground, for which there must be provided a wide and expensive right of way. Even at very high voltage, alternating current transmission of electric power also incurs substantial energy loss and presents difficult system problems which in some cases may be resolved only by the provision of uneconomically excessive power system capacity.

These problems have been brought into focus recently by the discovery of large quantities of oil and gas on the northern slopes of Alaska, in a region separated by many hundreds of miles from major centers of population and where temperatures are normally on the order of −50° C. The transportation of huge quantities of oil from such a region by either ship or pipeline presents not only physical and economic problems of unprecedented magnitude, but these problems are compounded by environmental and ecological hazards, together with attendant social and political considerations.

It is a general object of our invention, therefore, to provide an energy translating and transmission system and apparatus for continuously delivering fluid products and electric power derived from petroleum at a source location to a remote point for utilization or distribution with low loss, limited investment and minimal environmental hazard.

It is a more particular object of our invention to provide a system for converting, in close proximity to an oil field, oil and/or gas from subterranean wells into electrical energy and petrochemical products (primarily hydrocarbon fluids) and for transporting such electric energy and fluid products simultaneously through a common conduit designed for low transmission loss and hazard.

Still another object of our invention is to provide an improved dual transmission conduit for unidirectional electric current at very high D.C. voltage and for hydrocarbon products at high pressure and low temperature.

In carrying out our invention in one preferred embodiment we place a refinery and an electric generating plant in proximity to an oil field area, utilize heavy residual fuel oil from the refinery to fuel the generating plant, convert the generated electric current to unidirectional current at high transmission voltage (i.e. of the order of 200,000 to 1,000,000 V), provide an enclosed HVDC bus duct utilizing tubular steel or aluminum pipe as bus conductor, and transport a plurality of liquid and gaseous hydrocarbon products of the refinery through the enclosing duct and the conducting pipe line. One such product is carried in the enclosing duct or ducts in the form of a light dielectric gas such as methane, and other products, such as propane and butane are separately carried, preferably in liquid form at low temperature and high pressure, through the tubular bus conductors. No solid insulation is required on the bus conductor and the insulating gas and outer enclosure may be maintained at a low temperature close to the outside ambient temperature. Using direct current the conductive pipes or buses may be made of steel or other ferrous metal and the low temperature of the insulating gas and enclosure minimizes disturbance of frozen external landscapes. The entire duct enclosure is small in diameter relative to conductor spacing for elevated electric power lines and may be located at or below ground level on a narrow right of way; it is readily accessible for maintenance and repair. The dielectric gas is normally maintained at a pressure above the outside atmosphere but the pressure of the products in the tubular bus conductors may be above or below that of the dielectric gas, the particular pressures being selected to minimize consequences of duct leakage.

Our invention will be more fully understood and its several objects further appreciated by referring now to the following detailed specification taken in conjunction with the accompanying drawing in which:

FIG. 1 is a schematic diagram of an energy conversion and transmission system embodying our invention;

FIGS. 2A and 2B are axial and transverse cross-sectional views, respectively, of a single-conductor dual transmission duct embodying our invention in one aspect and characteristic of the system illustrated at FIG. 1;

FIGS. 3 and 4 are transverse cross-sectional views of several two-conductor duct structures embodying our invention in other forms and appropriate for use in the system illustrated at FIG. 1, and FIG. 5 is a schematic diagram of a sectionalized dual transmission conduit including intermediate fluid cooling and pumping stations.

Referring now to the drawing and particularly to FIG. 1, we have illustrated a system for conversion and dual transport of electrical energy and petrochemical products over a substantial distance from a remote Area 1 characterized by oil producing wells such as a well 10, to a region identified as Area 2, where these products and electrical energy are to be delivered for further distribution or utilization. For the purpose of illustration we have shown in Area 1 a gas well 11, the output of which may optionally be utilized in conjunction with our invention. The region identified as Area 1 may be thought of as a portion of the frozen artic tundra and the region identified as Area 2 may be regarded as a heavily populated region of North America such as the north central part of the United States. The energy conversion and transport system illustrated schematically at FIG. 1 has for its purpose the conversion of oil from the well 10, in part to electrical energy and in part to hydrocarbon products or other petrochemical derivatives, together with a high voltage direct current transmission conduit adapted also to transport fluid products derived from the oil while utilizing a gaseous oil derivative or natural gas from an adjacent source to insulate the electric transmission conductors and to maintain the transmission duct at appropriate temperature in relation to outside ambient conditions. Natural gas so utilized in a cold ambient temperature will be dried by cooling to improve its insulating quality.

At FIG. 1 we have shown in Area 1 and adjacent the well 10, an oil refinery 12, adapted to receive crude petroleum from the well 10 and to produce a plurality of liquid and gaseous fluid products indicated schematically as P1, P2, and P3. Such products may be, for example, hydrocarbon compounds such as methane, propane, butane and volatile hydrocarbon mixtures such as petroleum ether, gasoline and the like. The refinery 12 also produces a residual fuel oil identified by way of example as a product "bunker C", and the drawing indicates that such residual fuel oil is supplied to a steam plant 13 located adjacent the refinery 12. It will be understood by those skilled in the art that by referring to the several energy conversion and generating plants in Area 1 as being "adjacent" the oil well 10 or an oil field location it is meant that these facilities are close to a well location in the oil producing region in relation to a relatively remote delivery point in Area 2 for further distribution or utilization.

Steam produced in the plant 13 is shown supplied to a plurality of turbo-generators G1, G2, G3 and G4 at an electric generating station 14 which is also located adjacent the steam plant 13, refinery 12 and oil well 10. Exhaust steam from the turbo-generators may, if desired, be returned to the refinery 12, as through a conduit 12a, to supply all or part of the energy required to operate the refinery. Typically the turbo-generators G1-G4 are turbine-driven alternating current machines and supply electric current to associated step up transformers T1, T2, T3 and T4 in each of which the alternating voltage from the generator is increased to a high transmission or subtransmission level. In the illustrated embodiment of the invention, for example, each generator G1-G4 may produce electric current at 23,000 volts and the associated transformers T1-T4 respectively may have a secondary voltage of the order of 250,000 volts.

While we have shown for the purpose of illustration four turbo-generators G1-G4 in a single electric generating plant 14, it will be understood by those skilled in the art that the amount of generating capacity located adjacent to or in the region of any oil well or oil field may be selected to convert as much of the available petroleum energy into electric energy as is desired for transmission in the form of electric power. By way of illustration, each turbo-generator G1-G4 may generate 1,000 megawatts of power which appears at the output of the associated step up transformer T1-T4 at a voltage of 250,000 volts as indicated above, and the output voltage of these transformers is rectified and connected in series circuit relation to provide a unidirectional transmission voltage of 2,000,000 volts (i.e., 1,000,000 positive and 1,000,000 negative) from intermediate ground potential. If desired, of course, other magnitudes of DC voltage in the high transmission range may be utilized, for example voltages of the order of 200,000 to 2,000,000 volts.

Our invention contemplates that the electric power output of the generating station 14 be in the form of unidirectional current at high transmission voltage (HVDC). For this purpose the electric generating station 14 illustrated at FIG. 1 includes a plurality of high voltage diode rectifiers R1, R2, R3 and R4 connected, respectively, to the high voltage windings of the transformers T1-T4 through suitable alternating current circuit breakers C1, C2, C3 and C4 respectively. It will be understood by those skilled in the art that the alternating to direct current conversion apparatus R1-R4 may be of a variety of types. It will of course be recognized that at the high voltages contemplated static conversion apparatus is preferable to rotating apparatus; moreover we prefer to use for each of the high voltage rectifying valves R1-R4 an assembly of solid state semiconductor diodes of the large area silicon type. It will be understood that if desired controllable thyristor cells and valves may be used, but in the generating location herein contemplated diode rectifiers are sufficient because it is not expected that power will ever be fed from the converters R1-R4 into the transformers T1-T4.

In each of the high voltage rectifying valves R1-R4 alternating current supplied from the respective transformers T1-T4 is converted to direct current at substantially the same voltage, for example, 250,000 volts. The rectifiers R1-R4 are connected in series circuit relation in pairs on opposite sides of a grounded neutral terminal N and between positive and negative HVDC output terminals 15 and 16 respectively.

It is a principal feature of our invention that high voltage direct current from the electric generating station 14 and relatively volatile liquid and gaseous hydrocarbon refinery products from the refinery 12 and from gas wells are jointly conveyed, feasibly over great distances, through a dual fluid and electric power transmission conduit designed to minimize transmission loss, to minimize environmental hazard, to be readily accessible for maintenance and repair and to require a relatively narrow and inexpensive right of way. Such conduit is illustrated schematically at FIG. 1 and several modifications thereof are shown at FIGS. 2A, 2B, 3 and 4.

At FIG. 1 we have shown the positive and negative HVDC terminals 15 and 16 connected, respectively, to separate tubular bus conductors 20, 21 which extend from the electric generating station 14 in Area 1 to a delivery point in Area 2 illustrated as an HVDC transmission line 22. The tubular bus conductors 20, 21 are of relatively large diameter, as for example 24 inch pipe formed of steel, aluminum or other conductive metal capable of withstanding substantial pressure. We contemplate that ½ inch steel pipe of about 24 inch diameter will be suitable for this purpose when utilized for conduction of unidirectional current. As will appear hereinafter the tubular bus or pipe lines 20, 21 will be maintained at a relatively low temperature. Due to their large diameter they present a large cross-section and low electric resistance. When utilized to conduct direct current no eddy current or hysteresis losses will be generated.

The tubular bus conductors 20, 21 serve also as fluid conduits for one or more of the relatively volatile hydrocarbon refinery products, such as the products P1, P2 as indicated schematically at FIG. 1. The product P1, which may for example be liquified propane, is supplied through a pump 23 and suitable piping to the tubular bus 21; similarly the refinery product P2, which may be gasoline or a liquified hydrocarbon compound such as butane, is supplied through a pump 24 and suitable piping to the tubular bus 20. Preferably the products P1 and P2 are supplied to the bus conductors 21, 20, respectively, at low temperature and high pressure. If for example the outside ambient temperature in Area 1 is of the order of minus 50° C. to 0°C. thermal and electrical losses will be minimized by conveying the products P1, P2 at low temperatures of the order of zero degrees or less. In the case of a volatile product such as propane conveyed in liquified form, it is necessary of course to maintain the product under considerable pressure. High fluid pressure within the tubular bus conductors 20, 21 is desirable however for other purposes as will appear hereinafter.

Each tubular bus conductor is enclosed for substantially its full length within an outer tubular sheath or duct, illustrated respectively as 25, 26. Each tubular sheath or duct 25, 26 is also formed of conductive metal and connected to ground potential, preferably at about the axial center of its length and optionally at other intermediate points. The tubular enclosing sheaths 25, 26 are appreciably greater in diameter than the tubular bus conductors 20, 21 and each is concentrically located with respect to the associated bus thereby to form between them an annular space closed at each end, as by insulating end rings 25a and 26a. Preferably the bus ducts or sheaths 25, 26 are formed of steel pipe having for example ¼ inch thickness and 48 inch diameter. The annular space between each tubular bus and its enclosing sheath serves also as a conduit for fluid (preferably gaseous fluid) and as an insulating space between the enclosed bus and ground. The enclosing sheath or sheaths and the enclosed tubular bus conductors together constitute a dual fluid and electric conduit. The annular insulating space between each bus and its enclosing duct is utilized as a conduit for conveying a suitable dielectric gas such as methane derived as a product of the refinery 12 or from natural gas wells. Such a product P3 is shown for example as supplied to the sheathing duct 26 through a pump 30 and to the duct 25 through an interconnecting pipe 31. By way of illustration we have shown alternatively that gas from the well 11 may be supplied to these ducts through a pump 32 and the interconnecting pipe 31 in place of gas from the refinery 12. If desired of course the interconnecting pipe 31 may be omitted or shut off by suitable valve means and separate dielectric gases may be supplied to the separate enclosing ducts 25, 26 from the gas well 11 and refinery 12 respectively.

In the delivery region identified as Area 2, at the output ends of the dual fluid and electric conduits 20, 25 and 21, 26 we have shown the enclosing ducts or sheathing conduits 25 and 26 interconnected by a pipe 40 and connected through an output valve 41 to a gas delivery network 42. Similarly, we have shown the tubular conducting conduits 20, 21 electrically connected to the HVDC network 22 through diode check valves 45 and 50, respectively, and connected for supply of the contained fluid products through delivery valves 52 and 53, respectively, to suitable storage reservoirs for utilization apparatus (not shown).

At FIGS. 2A and 2B we have shown respectively, longitudinal and transverse cross-sectional views of one of the single-bus, dual conduits illustrated at FIG. 1, and like parts have been identified by the same reference numerals. Specifically, FIGS. 2A and 2B show the concentric dual conduit 20, 25 with the tubular bus 20 containing the hydrocarbon product P2 and the annular insulating space within the sheathing duct 25 containing the dielectric gas P3. The concentric pipes forming such a dual conduit may be maintained in concentric radially spaced relation by any suitable means. By way of illustration we have shown at FIGS. 2A and 2B a supporting structure formed of a plurality of resilient bow-shaped struts, each having its end sprung over angularly disposed and spaced apart studs 56 on the conductive pipe 20 and its outwardly bowed intermediate section in engagement with the internal surface of the outer sheath 25. Sets of three such supporting bows may be located at angularly spaced locations about the pipe 20, as illustrated at FIG. 2B. A set of such struts may be disposed about the pipe 20 at a single axial location and a plurality of such sets provided at axially spaced intervals along the dual conduit. Alternatively, individual supporting bows may be positioned along and around the tubular conducting pipe 20 in progressive axial and angular relation. Desirably the supporting bows 55 are formed of a suitable plastic insulating material designed to resist creep tracking and to provide a long creepage path. For example, such bows may be formed of alumina filled polyesters or epoxies and may be several feet in length. It is desirable that the surface, and preferably the entire body, of such insulators be of high and uniform electrical resistance thereby to produce a uniform distribution of HVDC voltage along the insulator surface.

It will be understood by those skilled in the art that various structural forms of the dual fluid and electric conduit characterizing our invention are available without departing from the spirit and scope of our invention. For example the tubular bus conductors 20, 21 may be enclosed in separate ducts or sheaths in parallel spaced relation as indicated at FIG. 1, may be enclosed in a common outer sheath preferably divided internally as shown at FIG. 3, or the tubular conductors and enclosing sheaths may be in mutual concentric relation as illustrated at FIG. 4. More specifically we have shown at FIG. 3 an embodiment of our invention wherein the tubular bus conductors 20, 21 are enclosed in a common outer sheath or duct 25A of flattened or oval transverse cross-section provided with a central axial dividing wall 60. Preferably the dividing wall 60 is formed of metal and is supported continuously or at spaced points in axially disposed mounting tracks 61 internally of the duct 25A. Preferably the mounting tracks 61 are of insulating material and the dividing wall is electrically grounded near the axial midpoint of the duct, as by a jumper 62 to the sheath 25a (FIG. 3). When the dividing wall 60 is so insulated from the sheath 25a and grounded at the midpoint of its length it may be used as the neutral return conductor of the HVDC circuit. To so utilize the conductive wall 60 its opposite ends will be connected to the neutral HVDC terminals at opposite ends of the duct, as to the terminal N at the input end and to a similar grounded neutral terminal (not shown) of the HVDC circuit 22. Such utilization of the dividing wall 60 eliminates need for complex and expensive earth electrodes at the HVDC neutral terminals and also reduces or eliminates the effects of electrolytic corrosion upon the outer sheath 25a.

The dual fluid and electric conduit illustrated at FIG. 3 also demonstrates that if desired the conductive capacity of the tubular bus conductors 20, 21 may be increased by drawing through them conductive cables 20a, 21a, respectively. While any suitable insulating supports for the bus conductors 20 or 21 may be used in the embodiment of FIG. 3, we have illustrated insulating bow supports 55 mounted in angularly spaced sets of three within each laterally adjacent section of the common outer sheath 25a.

At FIG. 4 we have illustrated another embodiment of dual fluid and electric conduit suitable for use with our invention. In this form the conduit comprises four mutually concentric steel pipes 20, 25, 26 and 27, the innermost pair 20, 25 constituting a single-conductor enclosed bus similar to that shown at FIGS. 2A and 2B and the outer pair 26, 27 constituting an outer concentric enclosed bus enclosing the inner pair. Specifically the pipes 20 and 26 at FIG. 4 constitute tubular bus conductors and are shown connected, respectively, to negative and positive electric terminals. The intermediate pipe 25 is connected to ground and constitutes a sheathing or enclosing duct for the conductor 20. Similarly the outermost pipe 27 is connected to ground and constitutes a sheathing conduit for the bus conductor 26. The entire array of concentric pipes is maintained in radially spaced relation by means of supporting bows 55 interposed in each annular space between the pipes in the same manner as illustrated at FIGS. 2A and 2B. In the embodiment shown at FIG. 4 insulating gas, such as the product P3, is supplied to all the annular spaces between the several concentric pipes so that the conductor 20 is adequately insulated from its enclosing duct 25 and the conductor 21 is adequately insulated from the adjacent inner and outer enclosing ducts 25 and 26. Within the tubular bus conductor 20 any desired refinery product may be conveyed, as for example a liquified hydrocarbon product such as the product P2 illustrated at FIGS. 1 and 2.

It is desirable that in practicing our invention the dielectric gas between each tubular bus conductor and its grounded enclosing sheath be maintained at a pressure above atmospheric, but that pressure may be either above or below the pressure of any liquid or gaseous fluid product contained within the tubular bus itself. By maintaining pressure of the dielectric gas above atmospheric intake of oxygen from outside the conduit system will be precluded. There is of course no oxygen within the system in normal operation and the outer enclosing sheath is grounded, so that any electric arc which may occur will cause no fire or explosion. On the other hand it is desirable that the pressure of the insulating gas in the annular space or spaces surrounding the tubular bus conductors be relatively low, so that the dielectric gas will not liquify even at the low temperatures of operation contemplated. For example if the external ambient temperature is of the order of minus 50° to zero degrees C. it is desirable that the outer duct enclosure and the gas in the insulating space be maintained at a temperature no greater than about 0° C. in order to minimize thermal loss. Thus if the tubular bus conductors contain a liquified gas (such as liquid propane) the surrounding dielectric gas will be at a pressure lower than that in the conducting tube but above atmosphere. If of course the product transported through the tubular conductor would reduce the insulating quality of the dielectric gas if mixed with it, it would be desirable to transport that product at a pressure less than that of the dielectric.

By the use of unidirectional current even at the high transmission voltages contemplated, and with the radial spacings available with outer sheaths even as small as 20 to 100 inches in diameter, it is considered feasible to use the tubular bus conductors without any solid insulating coating. While other dielectric gases may be used, methane is freely available from most natural gas wells and readily obtainable by refinery of petroleum products. Such gas in a dry condition has a high dielectric strength and will effectively insulate HVDC conductors spaced only several inches from a grounded enclosing sheath. If desired, of course, the tubular bus conductors may be coated with suitable vinyl or other plastic insulating materials applied in any desired manner.

The temperature and pressure conditions attainable during transport of electricity and hydrocarbon products in a dual conduit embodying our invention is fully compatible with external ambient conditions even in regions in extreme cold. For example, highly volatile hydrocarbon compounds such as butane or propane do not significantly increase in viscosity even at temperatures of the order of minus 60° C. This means that very little pumping energy must be supplied to move these liquids through the conduit; also because such liquids need not be maintained at temperatures significantly above the outside ambient heat losses are minimized. It is desirable that the temperature of the outer enclosing sheath in our dual transmission conduit be maintained at no more than about 0° C., at least in regions of extreme cold where higher temperatures would result in large thermal losses and melting where the pipe line is in contact with frozen ground.

Electrical resistance losses in the tubular bus conductors will tend to increase the temperatures of the fluid contained therein and of the insulating gas in the annular insulating space, and frictional loss over great distances will reduce pressure of both fluids. In pipelines of great length it may therefore be necessary or desirable to provide at spaced intervals along the length booster pumps to increase pressure and cooling means to reduce temperature. At FIG. 1 we have indicated schematically a gas cooling and booster pump station 70 for gas in the annular space and a cooling and booster pump station 71 for liquid or other fluid in the tubular bus 21. Similar stations may be provided at spaced points along each conduit 21, 26 and 20, 25.

Where cooling and pumping stations such as 70, 71 are provided it is of course desirable that fluid returned to the conduit from the station be isolated from that supplied to the inlet side of the station. This may be done by a simple insulating barrier in each conduit or, as indicated schematically at FIG. 5, by sectionalizing the several conduits and providing cooling and/or pumping stations between the sections.

While we have described certain preferred embodiments of our invention by way of illustration, many modifications will occur to those skilled in the art, and we therefore wish to have it understood that we intend in the appended claims to cover all such modifications as fall within the true spirit and scope of our invention.

What we claim as new and desire to secure by Letters Patent of the United States is:

1. A system for petrochemical conversion and dual transmission of fluid products and electrical energy derived from subterranean oil comprising:
   a. an oil refinery located in an oil producing region, said refinery including means for deriving from crude petroleum a plurality of fluid hydrocarbon products including residual fuel oil,
   b. a steam generating plant adjacent said refinery and including oil fired heating apparatus adapted to burn said fuel oil;
   c. an electric generating station including a prime mover adapted to be driven by steam from said plant, said generating station providing unidirectional electric current at high output voltage between positive and negative HVDC terminals,
   d. a dual transmission conduit between said oil producing region and a distant delivery point including a tubular bus conductor electrically connected to one said HVDC terminal and a tubular metallic enclosing duct electrically connected to ground potential, said conduit including insulating supporting means maintaining said tubular bus conductor in laterally spaced relation within said duct to define a substantially annular insulating space therebetween and said bus conductor and duct respectively providing isolated fluid passages therethrough,
   e. means for continuously conveying through said annular space within said tubular duct and to said delivery point a dielectric gas derived from a source in said oil producing region, said dielectric gas serving in its passage through said duct to insulate said bus conductor from ground potential,
   f. means for continuously conveying through said tubular bus conductor and to said delivery point a liquid hydrocarbon product of said refinery, and
   g. means maintaining said gas at pressure above atmospheric pressure.

2. A system according to claim 1 which includes two dual transmission conduits in parallel spaced-apart relation, the tubular bus conductors in the separate conduits being connected respectively to HVDC terminals of opposite polarity with respect to ground and wherein each said bus conductor is mounted concentrically within its enclosing duct.

3. A system according to claim 1 wherein said dual transmission conduit comprises two tubular bus conductors mounted in spaced apart relation in a common outer enclosing duct and said bus conductors are connected respectively to said positive and negative HVDC terminals.

4. A system according to claim 1 wherein said dual transmission conduit comprises a common tubular enclosing duct and a single pair of tubular bus conductors mounted therein in axially parallel spaced-apart relation and connected respectively to said positive and negative HVDC terminals.

5. A system according to claim 1 wherein said dual transmission conduit comprises a common tubular enclosing duct and a single pair of tubular bus conductors mounted therein in mutually coaxial radially spaced-apart relation and connected respectively to said positive and negative HVDC terminals.

6. A system according to claim 4 in which said enclosing duct includes a longitudinal median dividing wall between said bus conductors to provide separate annular fluid passageways surrounding said conductors in parallel laterally spaced relation.

7. A system according to claim 6 wherein said generating station includes a neutral terminal and said median dividing wall is conductive, insulating mounting means interposed between said duct and said wall, means electrically connecting said neutral terminal to said dividing wall at one end, and means connecting said dividing wall to ground potential at an intermediate point spaced substantially equally from both ends thereof.

8. A system according to claim 1 in which said dual transmission conduit comprises, an innermost tubular bus conductor, a first tubular enclosing duct surrounding said innermost conductor in radially spaced apart concentric relation, a second tubular bus conductor surrounding said first enclosing duct in radially spaced apart concentric relation, and an outermost tubular enclosing duct surrounding said second bus conductor in radially spaced-apart concentric relation, both said enclosing ducts being electrically connected to ground potential and said dielectric gas traversing all the annular insulating spaces between said ducts and conductors.

9. A system according to claim 1 which includes cooling means provided at spaced points along said dual transmission conduit for maintaining said dielectric gas within a desired temperature range in the region of 0° C.

10. A system according to claim 1 which includes a producing natural gas well in said oil producing region and wherein said dielectric gas is derived from said gas well.

11. A system according to claim 1 wherein at least one refined hydrocarbon product derived from said subterranean oil is a dielectric gas and wherein such gas is conveyed through said annular space.

12. Apparatus for dual transmission of electric power from a source of unidirectional current supply and passage of fluid petroleum derivatives comprising, a tubular metallic enclosing duct connected to ground potential, at least one tubular bus conductor extending through said duct from end to end, insulating means mounting said bus conductor in spaced-apart relation within said duct thereby to provide a central fluid passageway within said bus conductor and an outer fluid passageway in an annular space between said conductor and duct, means connecting said bus conductor at one end to a high voltage terminal of said current supply source, means continuously supplying to said central fluid passageway a fluid petroleum derivative, means continuously supplying to said outer passageway a dielectric gaseous petroleum derivative at a pressure greater than ambient atmospheric pressure, and means maintaining said dielectric gas at a temperature within a range between approximately 0° C. and the outside ambient temperature.

13. Apparatus according to claim 12 wherein said fluid petroleum derivative is a liquid at pressure above that of said gaseous petroleum derivative.

14. A conduit according to claim 12 which includes two tubular bus conductors mounted within said duct in parallel spaced relation and formed of ferrous metal, said bus conductors being connected to said unidirectional current supply source through high voltage terminals of opposite polarity with respect to ground.

15. The conduit of claim 14 wherein said enclosing duct includes a median longitudinal dividing wall forming a pair of laterally adjacent tubular compartments and one said bus conductor is positioned substantially coaxially in each said compartment.

16. The conduit of claim 15 wherein said dividing wall is formed of electrically conductive material and insulated from said enclosing duct, and means electrically connecting said dividing wall at one end to a grounded neutral terminal of said current supply force.

17. The conduit of claim 12 which includes two tubular bus conductors of different diameters both coaxially mounted within said duct and a coaxial tubular sheath radially interposed between said bus conductors and connected to ground potential.

18. The conduit of claim 12 wherein said bus conductor and said enclosing duct are formed of electrically conductive ferrous metal.

19. The conduit of claim 18 wherein said bus conductor and said duct are concentric steel pipes each having a diameter of the order of several feet and the ratio of their diameters is of the order of 2:1.

* * * * *